H. BEUSCH.
BEARING SHELL OR BEARING BOX.
APPLICATION FILED MAR. 8, 1918.
1,276,614. Patented Aug. 20, 1918.
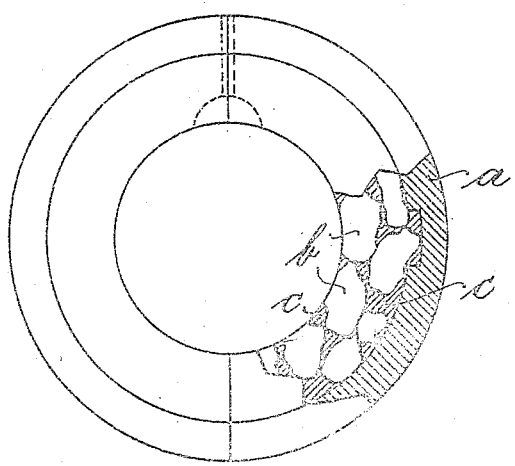
Witnesses:
Inventor:
Hermann Beusch.

UNITED STATES PATENT OFFICE.

HERMANN BEUSCH, OF LÜBECK, GERMANY.

BEARING-SHELL OR BEARING-BOX.

1,276,614.

Specification of Letters Patent.

Patented Aug. 20, 1918.

Application filed March 8, 1918. Serial No. 221,339.

*To all whom it may concern:*

Be it known that I, HERMANN BEUSCH, subject of the German Emperor, residing at Hochofenwerk, Lübeck, Germany, have invented certain new and useful Improvements in Bearing-Shells or Bearing-Boxes, of which the following is a specification, reference being had therein to the accompanying drawing.

This invention relates to certain new and useful improvements in bearing shells or bearing boxes and it has for its objects among others to provide an improved form of device of this nature which shall be durable and capable of resisting wear and also one capable of manufacture at minimum cost.

Other objects and advantages of the invention will hereinafter appear and the novel features thereof will be particularly pointed out in the appended claims.

The invention is clearly illustrated in the accompanying drawing which is an end elevation of a bearing shell or bearing box with portions broken away and parts in section.

In carrying out my invention, the method of construction is very simple. I take a shell $a$ of any suitable material and within the same I place hard substances, such as flint stones $b$ or the like, the spaces between the stones being filled with fluid metal, such as lead or the like, or with a suitable composition of greasing mass $c$.

It is not necessary that the entire space or interval between the bearing shell and the shaft be filled with stones, as I have found it sufficient to provide a circle of such stones about the shaft, as shown in the drawing, the other space being filled with fluid metal or a soft filling mass $c$.

The casing may be made so that the shaft is placed within the casing and the intervening space between the bearing shell or casing and the shaft is supplied with the stones and then the fluid metal or like material poured into position. Then by moving the shaft before the hardening of the metals or the mass $c$, the shaft being previously well oiled, the bearing can be readily removed from the shaft.

In some instances, I may provide the interior of the shell with rabbets or the like, into which the casing mass will flow so as to tightly hold the parts in position.

If desired, the bearing shell may be made in sections, as indicated in the drawing, either being formed that way or formed as a whole and then separated by sawing or otherwise.

What is claimed as new is:—

1. As an improved article of manufacture, a bearing box embodying a shell or casing and a mass of hard material with a soft metal filling the interstices between the said hard material.

2. A bearing box comprising a shell having rabbets upon its inner face, an embedding mass of soft composition and a multiplicity of hard bearing surfaces embedded in said mass and the mass engaged in said rabbets.

3. A bearing box comprising a shell with rabbets, plastic material having portions retained in said rabbets and hard substances embedded in said mass and forming the bearing surface for the shaft.

In testimony whereof I affix my signature in the presence of two witnesses.

HERMANN BEUSCH.

Witnesses:
WILH. GRAEFE,
HERM. MARTIN.